(12) United States Patent
Masada et al.

(10) Patent No.: US 8,110,048 B2
(45) Date of Patent: Feb. 7, 2012

(54) MAGNETIC POWDER SUITABLE FOR LOW-NOISE MEDIA

(75) Inventors: Kenji Masada, Okayama (JP); Yuzo Ishikawa, Okayama (JP); Hiroshi Kimura, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 0 days.

(21) Appl. No.: 12/986,198

(22) Filed: Jan. 7, 2011

(65) Prior Publication Data

US 2011/0123426 A1 May 26, 2011

Related U.S. Application Data

(63) Continuation of application No. 11/494,550, filed on Jul. 28, 2006, now abandoned.

(30) Foreign Application Priority Data

Jul. 28, 2005 (JP) .................................. 2005-218996

(51) Int. Cl.
*C23C 8/24* (2006.01)
*B22F 1/00* (2006.01)

(52) U.S. Cl. ......................................... 148/212; 75/348

(58) Field of Classification Search .................. 148/212; 75/348

See application file for complete search history.

(56) References Cited

U.S. PATENT DOCUMENTS

| 3,627,509 A | 12/1971 | Van der Giessen et al. |
| 5,692,125 A | 11/1997 | Schloss et al. |
| 2005/0123754 A1 | 6/2005 | Masada et al. |

FOREIGN PATENT DOCUMENTS

| JP | 08107036 | 4/1996 |
| JP | 10-69629 | 3/1998 |
| JP | 2001-6147 | 1/2001 |
| JP | 2003-263719 | 9/2003 |
| WO | WO 03/079333 | 9/2003 |

*Primary Examiner* — Jessee R. Roe

(74) *Attorney, Agent, or Firm* — Clark & Brody

(57) ABSTRACT

A method for producing a magnetic powder comprised chiefly of $Fe_{16}N_2$ comprising providing a starting powder comprising an oxy-hydroxide or oxide of iron and an amount of noble metal. The starting powder is reduced into an iron powder by a dry method using a hydrogen gas; and the iron powder is nitrided into a magnetic powder comprised chiefly of $Fe_{16}N_2$ particles using a nitrogen-containing gas at a temperature not higher than 200° C. The amount of noble metal is such that an amount that the atomic percent ratio of the noble metal content to Fe in the magnetic powder is 0.01-10.

6 Claims, 1 Drawing Sheet

MAGNETIC POWDER SUITABLE FOR LOW-NOISE MEDIA

CROSS REFERENCE TO RELATED APPLICATIONS

This is a continuation application of application Ser. No. 11/494,550, filed on Jul. 28, 2006, now abandoned.

FIELD OF THE INVENTION

This invention relates to an iron system magnetic powder for use in high recording density magnetic recording media, particularly to a magnetic powder composed of fine particles that enables production of magnetic recording tape exhibiting outstanding low-noise and high C/N (carrier-to noise) properties.

BACKGROUND ART

In order to achieve the increasingly higher recording densities required by today's magnetic recording media, recording wavelengths are being shortened. However, unless the particle size of the magnetic powder is much smaller than the length of the region for recording the short-wavelength signal, a distinct magnetic transition cannot be produced, which, in practical terms, makes recording impossible. Thus, the particles of the magnetic powder have to be sufficiently smaller than the recording wavelength.

Achieving higher recording density also requires increasing the resolving power of the recording signal, so it is also important to reduce magnetic recording medium noise. Particle size is a major factor in noise and the smaller the particle size is made, the more advantageous from the viewpoint of noise reduction. Accordingly, magnetic powder for high-density recording applications has to have a sufficiently small particle size to achieve the required noise reduction.

However, as the particles get smaller, it becomes more and more difficult for the particles to continue to exist as independent particles. For example, in the case of the metal magnetic powder generally used in a data storage tape, extreme refinement of the particle size makes the powder susceptible to sintering during the reduction stage of the production process. Sintering increases the average particle volume, which is undesirable because the larger sintered particles become a source of noise, and also degrades the magnetic properties of the powder by deforming the particle shape. In addition, when the powder is used to produce magnetic tape, the enlarged particles degrade dispersibility and cause loss of surface smoothness. The magnetic powder therefore becomes unsuitable for use in high recording density media. While a magnetic powder needs to have good magnetic properties to be suitable for a high-density recording medium, it also has to exhibit good powder properties during the tape manufacturing process, such as dispersibility, average particle volume, particle size distribution, specific surface area, tap density and so forth.

Known magnetic powders with excellent magnetic properties suitable for high density recording media include, for example, that taught by JP 2000-6147A (Ref. 1), which is a ferromagnetic metal powder whose properties include: major axis length of 30-120 nm, axial ratio of 3-8, Hc of 79.6~318.5 kA/m (1,000-4,000 Oe), and σ of 100~180 Am²/kg (100-180 emu/g).

Further, JP 10-69629A (Ref. 2) teaches a magnetic powder for achieving superior magnetic properties of a high quality that is composed of Fe containing 5-50 at. % of Co, 0.1-30 at. % of Al, 0.1-10 at. % of rare earth elements (defined to include Y), not more than 0.05 wt % of Periodic Table group 1 a elements and not more than 0.1 wt % of Periodic Table group 2 a elements and has Hc of 95.5~238.8 kA/m (1,200-3,000 Oe) and σs of 100~200 Am²/kg (100-200 emu/g).

JP 2003-263719A (Ref. 3) teaches a magnetic powder compatible with MR heads that is composed of acicular particles comprised primarily of Fe including Co, Al, R (rare earth elements; including Y) and oxygen within prescribed ranges, wherein Co/Fe=10-50 at. %, solid state Al/(Fe+Co) =5-50 at. %, R/(Fe+Co)=2-25 at. %, oxygen≦25 wt. %, average major axis length of the acicular particles=25-80 nm, and saturation magnetization σs=10~130 Am²/kg (10-130 emu/g).

As an iron nitride system magnetic powder suitable for high density recording media, WO 03/079333A1 (pamphlet; Ref 4) teaches a rare earth element-iron nitride system magnetic powder composed of substantially spherical or ellipsoid particles and states that, despite being composed of fine particles of around 20 nm (average particle volume of 4,187 nm³), the rare earth element-iron nitride system magnetic powder having $Fe_{16}N_2$ as its main phase has a high coercive force of 200 kA/m (2,512 Oe) or greater and high saturation magnetization owing to its small BET specific surface area, so that the recording density of a coated-type magnetic recording medium can be dramatically enhanced by using the rare earth element-iron nitride system magnetic powder.

The need for tape media of higher recording density continues to increase, however, and this in turn has created a need for the development of magnetic powders capable of responding to this need. A high C/N is indispensable to the realization of high recording density, i.e., a tape is required that is low in noise (N) and high in output (C). A magnetic powder small in particle volume and excellent in magnetic properties is preferable for producing such a medium. In recent years, advances in magnetic head technology have led to the development of GMR and other high-sensitivity heads capable of reading data recorded at low magnetization. Although this makes output less of a concern when using a magnetic powder of low magnetization σs, it aggravates the problem of noise, because when a high-sensitivity head is used even slight noise is detected as large noise to markedly degrade the C/N ratio. High recording density media must therefore be designed giving attention to both medium and head, with more focus on lowering noise than enhancing output.

However, efforts made to reduce particle size at the starting powder stage are frequently outweighed by the effects of sintering occurring at the reduction stage of the magnetic powder production process. The particle size of metal magnetic powders currently used in practical applications is around 45-60 nm (average particle volume: 5,000-8,000 nm³). In contrast, the average particle volume required by a low-noise medium is 4,000 nm³ or less, preferably 3,000 nm³ or less, but no practical magnetic powder of such adequately small average particle volume has yet been developed. When particles sinter together at the reduction stage, the presence of large particles locally within the magnetic powder increases particle-induced noise and also adversely affects roughness during tape manufacture. This makes production of low-noise tape impossible.

Sintering is prevented chiefly by 1) changing the composition of the starting powder (increasing the amount of sintering inhibitor used) and 2) lowering the reduction temperature to which the metallic iron is exposed. The first method of increasing the amount of nonmagnetic sintering inhibitor is undesirable because it increases noise by reducing the number of magnetic particles per unit volume. The second method is undesirable because lowering the reduction temperature not only has the desired effect of reducing sintering but also simultaneously lowers the particle reduction rate, which leads to problems such as that the proportion of the grain boundary rises because crystal grain growth within the particles is inhibited and the magnetic properties are markedly degraded by the occurrence of magnetic poles and the like owing to increased irregularity of the particle surfaces. These drawbacks of the conventional methods point up the need for development of a new sintering inhibiting technique that enables particle refinement without degrading magnetic properties.

OBJECT OF THE INVENTION

This invention was accomplished in the light of these circumstances and is directed to achieving strong prevention of sintering during reduction without causing the aforesaid problems and, by this, to provide a magnetic powder that enables the design of low-noise, high-output, high C/N, high recording density media suitable for use with GMR and other high-sensitivity heads.

SUMMARY OF THE INVENTION

The inventors conducted detailed experiments with regard to starting powder composition and reduction conditions in order to achieve the aforesaid object. As a result, it was found that a magnetic powder which is excellent in magnetic properties and provides a low-noise medium when used in tape production can be obtained by, at the time of starting powder preparation, incorporating one or more noble metal elements in the starting powder in the form of solid solution or coating, reducing the result under suitable conditions and optionally nitriding the reduced powder, thereby strongly preventing sintering during the reduction.

Specifically, this invention provides an iron system magnetic powder, particularly, a magnetic powder comprised chiefly of $Fe_{16}N_2$, wherein the powder contains a noble metal in an amount that the atomic ratio of total noble metal content to Fe is 0.01-10%.

As termed in this specification, the atomic ratio of element X (noble metal) to Fe means the ratio of the amount of element X contained in the powder to the amount of Fe contained therein expressed in atomic percent. The ratio is calculated from the X amount (at. %) and the Fe amount (at. %) determined by quantitative analysis of the powder as $100 \times (X\ amount\ [at.\ \%])/(Fe\ amount\ [at.\ \%])$. By "contains element X" is meant that element X was detected in quantitative analysis of the powder. The form in which the element X is present can be in solid solution in the magnetic phase or as adhered to the particle surfaces.

The iron system magnetic powder of this invention is a magnetic powder composed chiefly of Fe and may, for instance, be α-Fe, an alloy of Fe and Co (hereinafter called "Fe+Co alloy"), iron nitride (particularly one composed chiefly of $Fe_{16}N_2$), or the result obtained by subjecting any of these to oxidation treatment. The iron system magnetic powder preferably exhibits powder magnetic properties of coercive force of 160 kA/m or greater, more preferably 180 kA/m or greater, and saturation magnetization us of 40 $kA^2$/kg or greater.

Usable noble metal elements are Au, Ag and platinum group elements which include Ru, Rh, Pd, Os, Ir and Pt.

Elements other than the main constituent Fe that can be contained include, in addition to noble metals, N and Co for incorporation in the magnetic phase and, as elements known to provide sinter inhibiting effect, Al or rare earth elements (defined to include Y).

The so-constituted magnetic powder can be produced by passing iron oxy-hydroxide or iron oxide containing noble metal at an atomic ratio of total noble metal content to Fe of 0.01-10% through a reduction process. The magnetic powder is preferably provided as one having average particle volume V of 4,000 $nm^3$ or less, more preferably 3,000 $nm^3$ or less.

The value used as the average particle volume V ($nm^3$) herein was calculated using Equation (1) at each particle and taking the average of the results obtained:

$$V = L \times (D/2)^2 \times \pi \quad (1),$$

where the values of L and D were obtained by taking a transmission electron micrograph of the particles at a magnification of 300,000× or greater, selecting 1,000 of the imaged particles so as to include only ones whose boundaries could be distinguished from those of other particles and eliminate ones among two or more particles for which it could not be distinguished between whether the particles overlapped or were sintered together, measuring the longest and shortest axes of each selected particle and defining the longest length measured as the major axis length L (nm) and the shortest length measured as the minor axis length D (nm).

This invention provides an iron system magnetic powder obtained by a process that strongly inhibits sintering during reduction treatment at the time of production. When this magnetic powder is compared with a magnetic powder refined by addition of a large amount of Al or other element known to exhibit sinter inhibiting effect (hereinafter called "conventional sinter inhibiting element"), it is found to exhibit markedly improved Hc and us even at the same level of average particle volume. In addition, the magnetic powder of the invention achieves a higher degree of particle refinement at the same level of conventional sinter inhibiting element addition. Moreover, magnetic recording media produced using the refined magnetic powder of the invention in the magnetic layer were found to exhibit pronounced noise reduction effect. This invention can therefore be expected to enable a great improvement in the recording density of magnetic recording media and help to improve the performance of electronic equipment equipped with such media.

DESCRIPTION OF THE PREFERRED EMBODIMENTS

Figure 1:
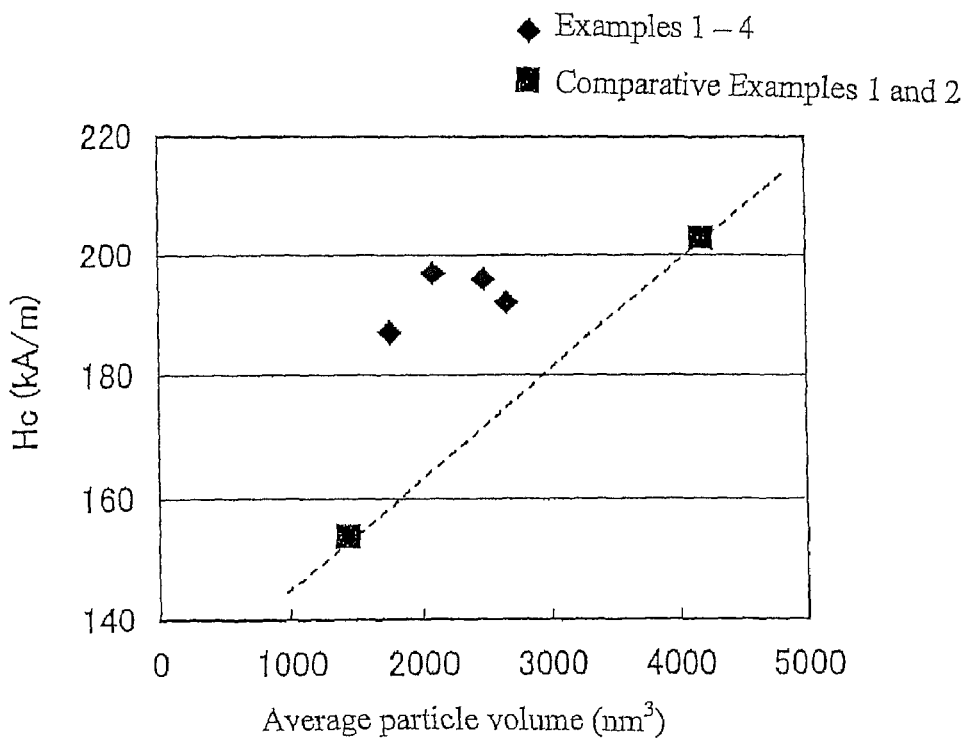
FIG. 1 is a graph plotted to show the relationship between Hc and average particle volume of the magnetic powders of Examples 1-4 and Comparative Examples 1 and 2.

The iron system magnetic powder of this invention is obtained by a process in which sintering during the reduction treatment is strongly inhibited by including noble metal in the starting powder prior to the stage of reduction treatment. Although numerous points have still not been clarified regarding the particulars of this sinter-preventing mechanism, the inventors believe that a major reason for the improved sinter prevention is that reduction starts at a lower temperature when noble metal is contained at the stage of the starting powder before reduction (iron oxy-hydroxide) than when it is not contained. Unlike when the reduction temperature is simply lowered, which, as explained earlier, lowers the reduction rate, in the case where a starting powder containing noble metal is used, the resulting decrease in the reduction starting temperature precludes a decline in the reduction rate even when the reduction temperature is lowered. Sintering can therefore be strongly prevented to enable production of a magnetic powder having excellent magnetic properties.

Al, rare earth elements (defined to include Y) and other conventional sinter inhibiting elements basically show no effect of substantially reducing reduction starting temperature. These conventional elements are therefore distinguished from the noble metals used in this invention in that they differ fundamentally in their effect. In this invention, good effect can be realized by concurrent use of Al, rare earth elements including Y and other conventional sinter inhibiting elements.

Noble metal elements usable in the invention include Au, Ag, Ru, Rh, Pd, Os, Ir and Pt. These elements work to lower the temperature at which reduction of the starting powder (iron oxy-hydroxide or iron oxide) commences. The amount of added noble metal elements in the starting powder before reduction is preferably such that the atomic ratio of total added noble metal content to Fe in the final magnetic powder becomes 0.01-10%, more preferably 0.01-1.0%. The amount added at this stage (at. % with respect to Fe) is approximately reflected in the noble metal content (at. % with respect to Fe) of the final magnetic powder. Either elemental or compound noble metal can be used. When magnetic powder composed chiefly of $Fe_{16}N_2$ is desired, it suffices to subject the reduced powder to nitriding treatment.

A production method for obtaining the sinter prevented magnetic powder of the invention will now be explained.

First, iron oxy-hydroxide or an iron oxide such as hematite, magnetite or wustite is prepared into a noble metal-containing starting powder to be subjected to reduction treatment. The term "noble metal-containing" is defined to include the case where noble metal is present (in solid solution) in the starting powder particles, the case where it is present as adhered to the particle surfaces, and the case where it is present in both forms.

The noble metal-containing iron oxy-hydroxide in which noble metal is present in solid solution in the particles is prepared by entraining noble metal in the iron oxy-hydroxide production reaction when synthesizing iron oxy-hydroxide by the wet method. For example, when iron oxy-hydroxide is produced by the method of neutralizing a ferrous salt solution (aqueous solution of $FeSO_4$, $FeCl_2$ or the like) with an alkali hydroxide (aqueous solution of NaOH or KOH) and then oxidizing the result with air or the like, the desired oxy-hydroxide containing noble metal present as dissolved state in the particles can be obtained by conducting the iron oxy-hydroxide production reaction in the presence of a nitrate or chloride of the noble metal. It also suffices to conduct the iron oxy-hydroxide production reaction in the presence of a nitrate or chloride of the noble metal when producing iron oxy-hydroxide by the method of neutralizing an aqueous solution of a ferrous salt with an alkali carbonate and then oxidizing the result with air or the like.

Another method that can be used is to conduct a reaction for producing iron oxy-hydroxide by neutralizing a ferric salt (aqueous solution of $FeCl_3$ or the like) with NaOH or the like, again in the presence of a nitrate or chloride of the noble metal.

These production methods can be carried out so as to incorporate the conventional sinter inhibiting element Al in the iron oxy-hydroxide particles. Incorporation of Co for improving magnetic properties and weatherability is also possible. Inclusion of these elements can be achieved by entraining an Al-containing salt or a Co-containing salt in the iron oxy-hydroxide production reaction.

Another method that can used to incorporate noble metal is to produce the iron oxy-hydroxide first and then coat its particle surfaces with the noble metal. In this case, the aforesaid method of synthesizing iron oxy-hydroxide is carried out to produce iron oxy-hydroxide without conducting an operation for incorporating noble metal in solid solution. Inclusion of solid solution Al is optional. Next, a noble metal nitrate or chloride and an Al-containing salt are added to a dispersed solution of the iron oxy-hydroxide and the particle surfaces are coated with the noble metal by the method of neutralization with an alkali or the method of evaporating off water from the dispersion. If desired, this coating operation can be conducted after noble metal has been dissolved into the particles in solid solution. It is also possible to deposit noble metal on the iron oxy-hydroxide particle surfaces by shining light from a mercury lamp or the like onto the particles to conduct photoreduction.

Coating with Al, rare earth elements (defined to include Y) and other conventional sinter inhibiting elements can be performed together with the noble metal coating. This can be achieved by adding an aqueous solution of a water-soluble Al salt, rare earth elements, yttrium and so forth.

Compounds usable as the aforesaid noble metal nitrate and chloride include platinic chloride hexahydrate, palladium nitrate, palladium chloride, rhodium nitrate, rhodium chloride, ruthenium chloride, iridium chloride, osmium chloride, gold chloride tetrahydrate, and silver nitrate. As the Al-containing salt that is the source of Al can be used, for example, water-soluble Al salt or aluminate. As the Co-containing salt that is the source of Co can be used, for example, cobalt sulfate or cobalt nitrate. As the rare earth elements and yttrium can be used sulfates or nitrates of the corresponding elements.

The amount of added noble metal is preferably such that the atomic ratio of the noble metal content to Fe in the magnetic powder becomes 0.01-10%. An atomic ratio of 0.01-1.0% is particularly preferable. When two or more noble metals are added, the total amount thereof is made to fall within these ranges. When the atomic ratio of noble metal to Fe is less than 0.01%, the effect of reducing reduction temperature sometimes cannot be stably obtained. When the atomic ratio of the noble metal content to Fe is greater than 10%, the proportion of nonmagnetic content increases. This makes it impossible to obtain good magnetic properties. In addition, most noble metals are expensive, so that increasing the amount used adds to the cost of magnetic powder production. The most realistic range of the atomic ratio of the noble metal content to Fe is therefore 0.01-1.0%, within which a strong reduction temperature decreasing effect can be obtained.

The so-obtained iron oxy-hydroxide containing noble metal is passed through filtering and water-washing processes and then dried at a temperature not higher than 200° C. to obtain a usable starting powder. Alternatively, the iron oxy-hydroxide can be subjected to a dewatering treatment at 200-600° C. or a reduction treatment in a hydrogen atmosphere of 5-20% water concentration, thereby converting the iron oxy-hydroxide particles to modified iron oxide particles that can be used as the starting material. Although the starting powder is required to be a compound containing iron, oxygen and hydrogen, it is otherwise not particularly limited and may, for example, be goethite, hematite, magnetite or wustite. In this specification, such an oxy-hydroxide or oxide of iron is called a "starting powder."

Next, the starting powder is reduced to α-Fe or Fe+Co alloy. The dry method employing hydrogen ($H_2$) is generally applied for the reduction treatment, and can be conducted a temperature of 250-500° C. A temperature of 250-400° C. is particularly preferable because, owing to the addition of noble metal, the reduction rate does not decrease appreciably even if the reduction temperature is lowered. When the reduction temperature is lower than 250° C., the reduction may be insufficient, in which case the magnetic properties are markedly degraded. In the case where nitriding is conducted after the reduction, moreover, the nitriding speed becomes extremely slow. An excessively high reduction temperature is undesirable because the particles tend to experience shape deterioration and inter-particle sintering even when a conventional sinter inhibiting element such as Al is incorporated as a countermeasure, so that the average particle volume increases and dispersibility declines. The best effect is therefore realized in a temperature range not exceeding 400° C.

Following reduction to α-Fe or Fe+Co alloy in the aforesaid reduction temperature range, the temperature can be raised to implement multi-stage reduction for enhancing crystallinity.

When nitriding treatment is conducted after reduction, the ammonia method set out in JP 11-340023A can be utilized. This method enables production of iron nitride powder composed chiefly of $Fe_{16}N_2$ by keeping the reduced powder in a stream of nitrogen-containing gas, typically ammonia, at a temperature of not higher than 200° C. for several tens of hours. The oxygen content of the gas used in the nitriding treatment is preferably several ppm or less.

For optimum effect, the nitriding treatment temperature, time and atmosphere should be controlled to make the atomic ratio of the N content of the magnetic powder to Fe 5-30%, more preferably about 10-30%. When the N/Fe atomic ratio is less than 5%, the nitriding effect of enhancing magnetocrystalline anisotropy to realize good magnetic properties is not exhibited to a sufficient degree. When the atomic ratio exceeds 30%, excessive nitriding occurs to degrade the magnetic properties by producing phases other than the desired $Fe_{16}N_2$.

Next, in order to obtain an iron system magnetic powder that can be handled stably in air, it is preferable to subject the particle surfaces to slow oxidation in a mixed gas of nitrogen containing about 0.01-2 vol. % of oxygen.

EXAMPLES

Examples of the invention will now be set out. First, however, the methods used to measure the properties obtained in the examples will be explained.

Composition Analysis

The amount of Fe in the magnetic powder was determined using a COMTIME-980 Hiranuma Automatic Titrator manufactured by Hiranuma Sangyo Co., Ltd. The amounts of Al, rare earth elements (defined as including Y), Pt, Pd, Rh, Ru, Ir, Os, Au, Ag and Cu in the magnetic powder were determined using an IRIS/AP High-resolution Inductively Coupled Plasma Atomic Emittion Spectrometer manufactured by Nippon Jarrell-Ash. These determinations were in mass percentages, which were converted to the atomic percentages of the elements, from which the atomic ratio of element X to Fe (X/Fe atomic ratio) was calculated.

Evaluation of Bulk Powder Properties

Average particle volume V ($nm^3$): The calculation was done using Equation (1) at each particle and taking the average of the results obtained:

$$V = L \times (D/2)^2 \times \pi \quad (1),$$

where the values of L and D were obtained by taking a transmission electron micrograph of the particles at a magnification of 300,000× or greater, selecting 1,000 of the imaged particles so as to include only ones whose boundaries could be distinguished from those of other particles and eliminate ones among two or more particles for which it could not be distinguished between whether the particles overlapped or were sintered together, measuring the longest and shortest axes of each selected particle and defining the longest length measured as the major axis length L (nm) and the shortest length measured as the minor axis length D (nm), then taking the average of the results obtained.

Magnetic properties (coercive force Hc, saturation magnetization σs, and squareness ratio SQ): A vibrating sample magnetometer (VSM) manufactured by Digital Measurement Systems Corp. was used to perform the measurements in an externally applied magnetic field of max. 796 kA/m.

Specific surface area: Measured by the BET method.

Example 1

To 4 L (four liters) of a 0.2 mol/L aqueous solution of $FeSO_4$ were added 0.5 L of a 12 mole/L aqueous solution of NaOH and an amount of ruthenium chloride to make Ru/Fe=0.1 at. %. The liquid mixture was maintained at a temperature of 40° C. while pure oxygen was blown into it at an average flow rate of 50 mL/min on a period of 2.5 hours, thereby precipitating iron oxy-hydroxide (goethite) containing Ru in solid solution. Upon completion of this oxidation treatment, the precipitate (iron oxy-hydroxide) was filtered off, washed with water and then dispersed in water.

The dispersion was added with an amount of yttrium nitrate to make Y/Fe=1.0 at. % and then, at 40° C., with an amount of sodium aluminate to make Al/Fe=18.3 at. %, and with NaOH to adjust the pH to 7-8, thereby adhering yttrium and aluminum to the particle surfaces. The solid component was separated from the liquid by filtering, washed with water and dried in air at 110° C.

The so-obtained powder consisted of iron oxy-hydroxide having an average particle diameter of 25 nm and by composition analysis was found to contain Al, Y and Ru at the rates of Al/Fe=17.7 at. %, Y/Fe=0.9 at. % and Ru/Fe=0.1 at. %. This powder was, as a starting material, reduced in hydrogen gas at 350° C. for 0.5 hour (reduction stage 1). Next, it was heated in the hydrogen gas to 650° C. and held at this temperature for 0.5 hour (reduction stage 2). It was then cooled to 100° C., at which temperature the gas was changed from hydrogen to ammonia, and thereafter heated to 127° C. Nitriding was conducted for 20 hours at this temperature in the ammonia gas. After the nitriding treatment, the temperature was lowered to 70° C. and the gas was changed to nitrogen gas to which was then added an amount of air so as to impart an $O_2$ concentration of 0.01-2% and subject the surface of the powder to slow oxidation. The powder was then taken out into the air.

The obtained powder was found by X-ray diffraction analysis to be a magnetic powder composed chiefly of $Fe_{16}N_2$ (also in Examples 2 to 4 and Comparative Examples 1 and 2) and to be composed of elliptical particles. The composition, average particle volume, magnetic properties and the like of this mainly $Fe_{16}N_2$ magnetic powder are shown in Table 1.

Example 2

Example 1 was repeated except that the amount of Ru added as a noble metal was changed to 0.5 at. %. The obtained powder was found by composition analysis to contain Al, Y and Ru at the rates of Al/Fe=17.9 at. %, Y/Fe=1.0 at. % and Ru/Fe=0.4 at. %. The properties of this mainly $Fe_{16}N_2$ magnetic powder are shown in Table 1.

Example 3

Example 1 was repeated except that the amount of Ru added as a noble metal was changed to 1.0 at. % and the Ru was not incorporated in solid solution but as adhered to the particle surfaces. That is, Ru was not entrained in the iron oxy-hydroxide production reaction during synthesis of iron oxy-hydroxide by the wet method used in Example 1. Instead, ruthenium chloride was added to the liquid in which the synthesized iron oxy-hydroxide was dispersed, in an amount to make Ru/Fe=1.0 at. %. Ru was adhered to the iron oxy-hydroxide particles by the method of neutralization with NaOH, and then subjected to reduction treatment as the starting powder.

The obtained powder was found by composition analysis to contain Al, Y and Ru at the rates of Al/Fe=16.7 at. %, Y/Fe=1.0 at. % and Ru/Fe=0.8 at. %. The properties of this mainly $Fe_{16}N_2$ magnetic powder are shown in Table 1.

Example 4

Example 1 was repeated except that element added as the noble metal was changed to Pd and the amount added was changed to 1.0 at. %. The obtained powder was found by composition analysis to contain Al, Y and Pd at the rates of Al/Fe=17.8 at. %, Y/Fe=0.9 at. % and Pd/Fe=0.02 at. %. The properties of this mainly $Fe_{16}N_2$ magnetic powder are shown in Table 1.

Comparative Example 1

Example 1 was repeated except that no noble metal was added and the stage 1 reduction temperature was changed to 450° C. The obtained powder was found by composition analysis to contain Al and Y at the rates of Al/Fe=17.2 at. % and Y/Fe=1.0 at. %. The properties of this mainly $Fe_{16}N_2$ magnetic powder are shown in Table 1.

Comparative Example 2

To 4 L (four liters) of a 0.2 mol/L aqueous solution of $FeSO_4$ were added 0.5 L of a 12 mole/L aqueous solution of NaOH and an amount of sodium aluminate to make Al/Fe=9.1 at. %. The liquid mixture was maintained at a temperature of 40° C. while pure oxygen was blown into it at an average flow rate of 50 mL/min on a period of 2.5 hours, thereby precipitating iron oxy-hydroxide (goethite). Upon completion of this oxidation treatment, the precipitate (iron oxy-hydroxide) was filtered off, washed with water and then dispersed in water.

The dispersion was added with an amount of yttrium nitrate to make Y/Fe=1.0 at. % and then, at 40° C., with an amount of sodium aluminate to make Al/Fe=18.3 at. %, and with NaOH to adjust the pH to 7-8, thereby adhering yttrium and aluminum to the particle surfaces. The solid component was separated from the liquid by filtering, washed with water and dried in air at 110° C., and then the powder obtained was subjected to the same reduction process as Example 1.

The obtained powder was found by composition analysis to contain Al and Y at the rates of Al/Fe=26.3 at. % and Y/Fe=1.1 at. %. The properties of this mainly $Fe_{16}N_2$ magnetic powder are shown in Table 1.

TABLE 1

| | Composition | | | | | Reduction conditions | | | | Nitriding conditions | | Ave particle vol $nm^3$ | Bulk properties | | | |
|---|---|---|---|---|---|---|---|---|---|---|---|---|---|---|---|---|
| | Reduction promoter element | | | | | Stage 1 | Stage 1 | Stage 2 | Stage 2 | | | | BET $m^2/g$ | Hc kA/m | σs $kA^2/kg$ | SQ |
| | Element | Added as | Al At. % | Y At. % | N At. % | temp ° C. | time hr | temp ° C. | time hr | Temp ° C. | Time hr | | | | | |
| | | | At. % | | | | | | | | | | | | | |
| Example 1 | Ru | Sol | 0.1 | 17.7 | 0.9 | 21.0 | 350 | 0.5 | 650 | 0.5 | 127 | 20 | 2481 | 90 | 196 | 47 | 0.49 |
| Example 2 | Ru | Sol | 0.4 | 17.9 | 1.0 | 22.4 | 350 | 0.5 | 650 | 0.5 | 127 | 20 | 2103 | 92 | 197 | 45 | 0.48 |
| Example 3 | Ru | Coat | 0.8 | 16.7 | 1.0 | 23.0 | 350 | 0.5 | 650 | 0.5 | 127 | 20 | 1766 | 93 | 187 | 43 | 0.48 |
| Example 4 | Pd | Sol | 0.02 | 17.8 | 0.9 | 20.1 | 350 | 0.5 | 650 | 0.5 | 127 | 20 | 2663 | 88 | 192 | 50 | 0.49 |
| Comparative Example 1 | None | — | — | 17.2 | 1.0 | 21.5 | 450 | 0.5 | 650 | 0.5 | 127 | 20 | 4186 | 82 | 203 | 53 | 0.50 |
| Comparative Example 2 | None | — | — | 26.3 | 1.1 | 17.1 | 450 | 0.5 | 650 | 0.5 | 127 | 20 | 1436 | 110 | 154 | 36 | 0.45 |

As can be seen from Table 1, the magnetic powders of the Examples produced by subjecting a starting powder containing a prescribed amount of noble metal to reduction treatment at a low reduction temperature of 350° C. were obtained as fine magnetic powders having an average particle volume of not greater than 4,000 $nm^3$. Moreover, owing to the high degree to which they were reduced, the magnetic powders exhibited excellent magnetic properties, namely, Hc of 160 kA/m or greater and σs of 40 $kA^2$/kg or greater.

In contrast, the average particle volume of the magnet powder of Comparative Example 1 came to exceed 4,000 $nm^3$ because the absence of noble metal in the starting powder prior to reduction and the use of the ordinary reduction temperature of 450° C. made adequate sinter prevention impossible. In Comparative Example 2, even though no noble metal was included in the starting powder prior to reduction and the ordinary reduction temperature of 450° C. was used, a passably small average particle volume was nevertheless achieved thanks to the inclusion of a large amount of the conventional sinter inhibiting element of Al. However, as can be seen from Comparative Example 4 discussed below, the magnetic powder of Comparative Example 2 did not enable fabrication of a magnetic recording medium exhibiting the excellent properties obtainable using an invention magnetic powder.

Figure 2:
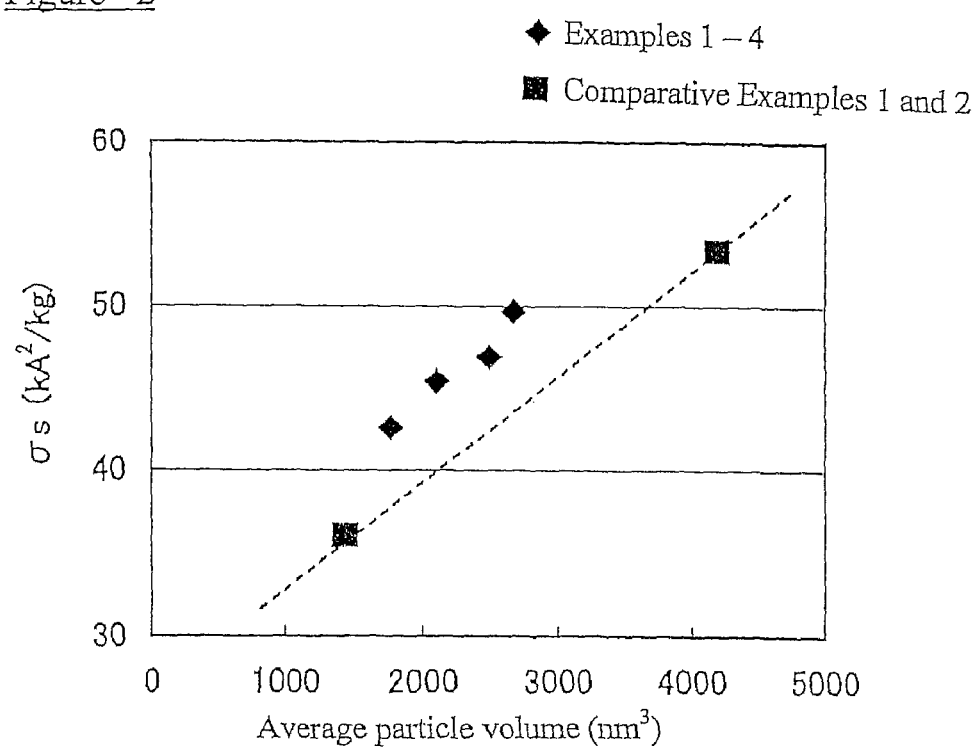
FIG. 2 a graph plotted to show the relationship between us and average particle volume of the magnetic powders of Examples 1-4 and Comparative Examples 1 and 2.

The values of Hc and σs obtained at the average particle volumes shown in Table 1 are plotted in FIGS. 1 and 2, respectively.

As can be seen from these graphs, in the case of the magnetic powders of the Examples produced by reducing starting powder containing noble metal at a low temperature, the magnetic properties were markedly better for the same average particle volume. In addition, a magnetic powder of smaller average particle volume was obtained for the same level of conventional sinter inhibiting element content. In other words, magnetic powders were obtained that fell in the region above the straight line connecting the two Comparative Example plots and exhibited good balance between average particle volume and magnetic property.

Example 5

The iron nitride system magnetic powder of Example 1 was used to fabricate a magnetic tape of double-layer structure including a magnetic layer and a nonmagnetic layer and the electromagnetic conversion characteristics of the tape were evaluated. The magnetic coating fluid was prepared by blending 100 parts by mass of the magnetic powder with the other components set out below in the indicated number of parts by mass. The nonmagnetic coating fluid was prepared by blending 80 parts by mass of nonmagnetic powder with the other components set out below in the indicated parts by mass. Each mixture was kneaded and dispersed to obtain a coating fluid using a kneader and a sand grinder. The coating fluid for forming the magnetic layer and the coating fluid for forming the nonmagnetic layer (underlayer) were applied onto a base film composed of an aramid support to obtain the desired underlayer thickness of 2.0 μm and magnetic layer thickness of 0.10 μm. The magnetic layer was oriented while still damp by exposure to a magnetic field, whereafter drying and calendering were conducted to obtain a double-layer structure magnetic tape.

Magnetic Coating Material Composition

| Magnetic powder | 100 parts by mass |
| Carbon black | 5 parts by mass |
| Alumina | 3 parts by mass |
| Vinyl chloride resin (MR110) | 15 parts by mass |
| Polyurethane resin (UR8200) | 15 parts by mass |
| Stearic acid | 1 part by mass |
| Acetylacetone | 1 part by mass |
| Methyl ethyl ketone | 190 parts by mass |
| Cyclohexanone | 80 parts by mass |
| Toluene | 110 parts by mass |

Nonmagnetic Coating Material Composition

| Nonmagnetic powder (α-$Fe_2O_3$) | 85 parts by mass |
| Carbon black | 20 parts by mass |
| Alumina | 3 parts by mass |
| Vinyl chloride resin (MR110) | 15 parts by mass |
| Polyurethane resin (UR8200) | 15 parts by mass |
| Methyl ethyl ketone | 190 parts by mass |
| Cyclohexanone | 80 parts by mass |
| Toluene | 110 parts by mass |

The magnetic properties and the magnetic conversion properties (noise, output, C/N ratio) of the obtained magnetic tape were measured. In C/N ratio measurement, a drum tester was attached to the recording head and a digital signal was recorded at a recording wavelength of 0.35 μm. At this time, an MR head was used to measure the reproduced signal and noise was measured as demodulation noise. In evaluation, the noise, output and C/N ratio in the case of using the magnetic powder of Comparative Example 1 was defined as 0 dB. The results of the evaluations are shown in Table 2.

Examples 6-8

Example 5 was repeated except that the magnetic powders of Examples 2-4 were used. The results of the same evaluations as carried out in Example 5 are shown in Table 2.

Comparative Examples 3-4

Example 5 was repeated except that the magnetic powders obtained in Comparative Examples 1 and 2 were used. The results of the same evaluations as carried out in Example 5 are shown in Table 2.

TABLE 2

| Example No. | Magnetic powder used | Magnetic conversion measurements | | |
| --- | --- | --- | --- | --- |
| | | Output (dB) | N(dB) | C/N (dB) |
| Example 5 | Example 1 | −0.3 | −2.3 | 2.0 |
| Example 6 | Example 2 | −0.3 | −3.0 | 2.7 |
| Example 7 | Example 3 | −0.5 | −3.7 | 3.2 |
| Example 8 | Example 4 | −0.2 | −2.0 | 1.8 |
| Comparative Example 3 | Comparative Example 1 | 0.0 | 0.0 | 0.0 |
| Comparative Example 4 | Comparative Example 2 | −4.4 | −4.6 | 0.2 |

Comparing the results shown in Table 2 for Examples 5-8 with those shown for Comparative Example 3, it can be seen that the double-layer tape of Examples 5-8 using the magnetic powders of Examples 1-4 were lower in noise than the double-layer tape of Comparative Example 3. The double-layer tape of Comparative Example 4 used the magnetic powder of Comparative Example 2 which, owing to the inclusion of a large amount of a conventional sinter inhibiting element, had a small average particle volume, so that the double-layer tape of Comparative Example 4 was lower in noise than those of the Examples. However, it was markedly low in output and also inferior to the Examples in C/N ratio. Improved C/N ratio was achieved in all of Examples 5-8, so that there could be obtained excellent magnetic recording media of low noise and high C/N ratio.

What is claimed is:

1. A method for producing a magnetic powder comprised chiefly of $Fe_{16}N_2$ comprising:
providing a starting powder comprising an oxy-hydroxide or oxide of iron and an amount of noble metal;
reducing the starting powder into an iron powder by a dry method using a hydrogen gas; and
nitriding the iron powder into a magnetic powder comprised chiefly of $Fe_{16}N_2$ particles using a nitrogen-containing gas at a temperature not higher than 200° C.,
wherein the amount of noble metal is such an amount that the atomic percent ratio of the noble metal content to Fe in the magnetic powder is 0.01-10.

2. The method of claim 1, wherein an average particle volume of the magnetic powder is 4,000 $nm^3$ or less.

3. The method of claim 1, wherein the magnetic powder has a coercive force of 160 kA/m or greater.

4. The method of claim 1, wherein the noble metal in the starting powder is at least one of the elements selected from the group consisting of Au, Ag, Ru, Rh, Pd, Ir, and Pt.

5. The method of claim 4, wherein an average particle volume of the magnetic powder is 4,000 $nm^3$ or less.

6. The method of claim 4, wherein the magnetic powder has a coercive force of 160 kA/m or greater.

* * * * *